US012057056B2

(12) United States Patent
Li et al.

(10) Patent No.: US 12,057,056 B2
(45) Date of Patent: Aug. 6, 2024

(54) DRIVING CIRCUIT AND DISPLAY PANEL

(71) Applicant: TCL CHINA STAR OPTOELECTRONICS TECHNOLOGY CO., LTD., Guangdong (CN)

(72) Inventors: Ruixiong Li, Guangdong (CN); Jinjia Chen, Guangdong (CN)

(73) Assignee: TCL CHINA STAR OPTOELECTRONICS TECHNOLOGY CO., LTD., Guangdong (CN)

( * ) Notice: Subject to any disclaimer, the term of this patent is extended or adjusted under 35 U.S.C. 154(b) by 0 days.

(21) Appl. No.: 17/755,464

(22) PCT Filed: Feb. 25, 2022

(86) PCT No.: PCT/CN2022/077895
§ 371 (c)(1),
(2) Date: Apr. 29, 2022

(87) PCT Pub. No.: WO2023/151135
PCT Pub. Date: Aug. 17, 2023

(65) Prior Publication Data
US 2024/0169890 A1 May 23, 2024

(30) Foreign Application Priority Data
Feb. 14, 2022 (CN) ......................... 202210135463.3

(51) Int. Cl.
*G09G 3/32* (2016.01)

(52) U.S. Cl.
CPC ....... *G09G 3/32* (2013.01); *G09G 2300/0842* (2013.01); *G09G 2320/0271* (2013.01); *G09G 2330/021* (2013.01)

(58) Field of Classification Search
CPC ............. G09G 3/32; G09G 2300/0842; G09G 2320/0271; G09G 2330/021
See application file for complete search history.

(56) References Cited

U.S. PATENT DOCUMENTS 10,997,916 B2 5/2021 Zhang et al.
2016/0232848 A1 8/2016 Meng et al.
(Continued)

FOREIGN PATENT DOCUMENTS

CN 104064139 A 9/2014
CN 110010057 A 7/2019
(Continued)

OTHER PUBLICATIONS

International Search Report in International application No. PCT/CN2022/077895, mailed on Aug. 29, 2022.
(Continued)

*Primary Examiner* — Dmitriy Bolotin
(74) *Attorney, Agent, or Firm* — PV IP PC; Wei Te Chung; Zhigang Ma

(57) ABSTRACT

A driving circuit and a display panel are provided. The driving circuit includes a light-emitting device, a light-emitting controlling module, and a grayscale controlling module. The grayscale controlling module includes a first transistor and a second transistor. A conduction time of the first transistor partially overlaps the conduction time of the second transistor to realize that a light-emitting duration of the light-emitting device is less than a minimum conduction time of the first transistor or the minimum conduction time of the second transistor.

20 Claims, 10 Drawing Sheets

(56) References Cited

U.S. PATENT DOCUMENTS

| | | | | |
|---|---|---|---|---|
| 2020/0118494 A1* | 4/2020 | Park | G09G 3/3258 | |
| 2020/0219435 A1* | 7/2020 | Chen | G09G 3/3233 | |
| 2022/0114947 A1* | 4/2022 | Chang | G09G 3/30 | |
| 2022/0408528 A1* | 12/2022 | Kuroki | H05B 45/345 | |
| 2023/0230545 A1* | 7/2023 | Kim | G09G 3/3233 | 345/212 |
| 2024/0032175 A1* | 1/2024 | Bouchard | H05B 45/59 | |
| 2024/0096265 A1* | 3/2024 | Sohn | G09G 3/32 | |

FOREIGN PATENT DOCUMENTS

| | | | |
|---|---|---|---|
| CN | 110021264 | A | 7/2019 |
| CN | 110491335 | A | 11/2019 |
| CN | 111243514 | A | 6/2020 |
| CN | 112017589 | A | 12/2020 |
| CN | 112767883 | A | 5/2021 |
| CN | 113571009 | A | 10/2021 |
| CN | 113689821 | A | 11/2021 |
| WO | 2021238897 | A1 | 12/2021 |

OTHER PUBLICATIONS

Written Opinion of the International Search Authority in International application No. PCT/CN2022/077895, mailed on Aug. 29, 2022.

Chinese Office Action issued in corresponding Chinese Patent Application No. 202210135463.3 dated Oct. 21, 2022, pp. 1-9.

* cited by examiner

DRIVING CIRCUIT AND DISPLAY PANEL

FIELD OF THE DISCLOSURE

The present disclosure relates to display technology, and more particularly, to a driving circuit and a display panel.

BACKGROUND

Nowadays, three main dimming techniques are pulse width adjustment dimming, analog dimming, and digital dimming. Many light-emitting diode (LED) light-emitting devices on the market support one or more of the dimming techniques. The pulse width adjustment dimming technique is a dimming technique for repeatedly turning on/off the LED light-emitting device with a simple digital pulse. It is only necessary to provide a variety of width and narrow digital pulses to simply change the output current, thereby regulating the brightness of the LED.

The light-emitting diode (LED) light-emitting device typically adopts the pulse width adjustment dimming technique in the related art. A light-emitting device is controlled to display grayscale by controlling the driving current and the light-emitting duration of the light-emitting device. Specifically, shorter light-emitting length may display low grayscale, and longer length may display high grayscale.

However, the driving circuit of the LED light-emitting device is used to make driving current constant so the minimum length of the conduction time of the passage of the driving current is the minimum conduction time of the transistor. The display time required for the minimum grayscale is less than the passage of the driving current, so it may be difficult for the driving circuit to display low grayscale.

SUMMARY

Technical Problem

An object of the present disclosure is to propose a driving circuit and a display panel to deal with the problem that a low grayscale is hard to be shown by the driving circuit in the related art.

Technical Solution

According to a first aspect of the present disclosure, a driving circuit includes: a light-emitting device, connected to a light-emitting circuit; a light-emitting controlling module that is fed with a scanning signal and a data signal and is connected to the light-emitting circuit, configured to deliver the data signal to the light-emitting device in response to the scanning signal; and a grayscale controlling module, connected to the light-emitting circuit and configured to control conduction or cutoff of the light-emitting circuit; the grayscale controlling module comprising a first transistor and a second transistor; a source and a drain of the first transistor and a source and a drain of the second transistor all being connected to the light-emitting circuit; wherein a conduction time of the first transistor partially overlaps the conduction time of the second transistor to realize that a light-emitting duration of the light-emitting device is less than a minimum conduction time of the first transistor or the minimum conduction time of the second transistor.

Optionally, the first transistor is one of an N-type transistor and a P-type transistor, and the second transistor is the other of an N-type transistor and a P-type transistor.

Optionally, a conduction time of the P-type transistor is greater than a cut-off time of the P-type transistor in a predetermined period; the driving circuit controls a light-emitting duration of the light-emitting device based on the conduction time of the N-type transistor.

Optionally, a gate of the first transistor is fed with a first controlling signal; a gate of the second transistor is fed with a second controlling signal; there is a phase difference between the first controlling signal and the second controlling signal.

Optionally, a duty ratio of the first controlling signal is equal to a duty ratio of the second controlling signal.

Optionally, the first transistor is conducted before the second transistor is conducted, and the first transistor is cut off before the second transistor is cut off; or the second transistor is conducted before the first transistor is conducted, and the second transistor is cut off before the first transistor is cut off.

Optionally, the driving circuit further comprises a third transistor; a gate of the third transistor is electrically connected to a third controlling terminal; a source of the third transistor and a drain of the third transistor are both connected between a first supply voltage terminal and other modules.

Optionally, the first transistor is one of an N-type transistor and a P-type transistor, and the second transistor is the other of an N-type transistor and a P-type transistor.

Optionally, the third transistor is conducted when or before the first transistor and the second transistor are simultaneously conducted; the third transistor is cut off when or after the first transistor or the second transistor is cut off.

Optionally, the conduction time of the third transistor is equal to the conduction time of the first transistor or the conduction time of the second transistor.

Optionally, the light-emitting controlling module comprises: a fourth transistor, having a gate connected to a fourth node, a source and a drain both connected with the light-emitting circuit; a fifth transistor, having a gate electrically connected to a scanning terminal, a source electrically connected to a data terminal, and a drain electrically connected to the fourth node; and a storage capacitor, electrically connected between the fourth node and a first supply voltage terminal. The gate of the first transistor is electrically connected to the first controlling terminal; the source of the first transistor and the drain of the first transistor both connected to the light-emitting circuit. The gate of the second transistor is electrically connected to a second controlling terminal; the source of the second transistor and the drain of the second transistor both connected to the light-emitting circuit.

According to a second aspect of the present disclosure, a display panel comprising a plurality of pixel units arranged in an array is provided. Each of the plurality of pixel units includes a driving circuit. The driving circuit includes: a light-emitting device, connected to a light-emitting circuit; a light-emitting controlling module that is fed with a scanning signal and a data signal and is connected to the light-emitting circuit, configured to deliver the data signal to the light-emitting device in response to the scanning signal; and a grayscale controlling module, connected to the light-emitting circuit and configured to control conduction or cutoff of the light-emitting circuit; the grayscale controlling module comprising a first transistor and a second transistor; a source and a drain of the first transistor and a source and a drain of the second transistor all being connected to the light-emitting circuit; wherein a conduction time of the first transistor partially overlaps the conduction time of the second transistor to realize that a light-emitting duration of the light-emitting device is less than a minimum conduction time of the first transistor or the minimum conduction time of the second transistor. The first transistor is one of an N-type transistor and a P-type transistor, and the second transistor is the other of an N-type transistor and a P-type transistor. A conduction time of the P-type transistor is greater than a cut-off time of the P-type transistor in a predetermined period; the driving circuit controls a light-emitting duration of the light-emitting device based on the conduction time of the N-type transistor.

Optionally, a gate of the first transistor is fed with a first controlling signal; a gate of the second transistor is fed with a second controlling signal; there is a phase difference between the first controlling signal and the second controlling signal.

Optionally, a duty ratio of the first controlling signal is equal to a duty ratio of the second controlling signal.

Optionally, the first transistor is conducted before the second transistor is conducted, and the first transistor is cut off before the second transistor is cut off; or the second transistor is conducted before the first transistor is conducted, and the second transistor is cut off before the first transistor is cut off.

Optionally, the driving circuit further comprises a third transistor; a gate of the third transistor is electrically connected to a third controlling terminal; a source of the third transistor and a drain of the third transistor are both connected between a first supply voltage terminal and other modules.

Optionally, the first transistor and the second transistor are both N-type transistors, and the third transistor is a P-type transistor; or the first transistor and the second transistor are both P-type transistors, and the third transistor is an N-type transistor.

Optionally, the third transistor is conducted when or before the first transistor and the second transistor are simultaneously conducted; the third transistor is cut off when or after the first transistor or the second transistor is cut off.

Optionally, the conduction time of the third transistor is equal to the conduction time of the first transistor or the conduction time of the second transistor.

Optionally, the light-emitting controlling module comprises: a fourth transistor, having a gate connected to a fourth node, a source and a drain both connected with the light-emitting circuit; a fifth transistor, having a gate electrically connected to a scanning terminal, a source electrically connected to a data terminal, and a drain electrically connected to the fourth node; and a storage capacitor, electrically connected between the fourth node and a first supply voltage terminal. The gate of the first transistor is electrically connected to the first controlling terminal; the source of the first transistor and the drain of the first transistor both connected to the light-emitting circuit. The gate of the second transistor is electrically connected to a second controlling terminal; the source of the second transistor and the drain of the second transistor both connected to the light-emitting circuit.

Advantageous Effect

The present disclosure proposes a driving circuit and a display panel. The driving circuit includes: a light-emitting device, connected to a light-emitting circuit; a light-emitting controlling module that is fed with a scanning signal and a data signal and is connected to the light-emitting circuit, configured to deliver the data signal to the light-emitting device in response to the scanning signal; and a grayscale controlling module, connected to the light-emitting circuit and configured to control conduction or cutoff of the light-emitting circuit; the grayscale controlling module comprising a first transistor and a second transistor; a source and a drain of the first transistor and a source and a drain of the second transistor all being connected to the light-emitting circuit; wherein a conduction time of the first transistor partially overlaps the conduction time of the second transistor to realize that a light-emitting duration of the light-emitting device is less than a minimum conduction time of the first transistor or the minimum conduction time of the second transistor. Because the conduction time of a first transistor partially overlaps the conduction time of a second transistor is controlled by the phase difference between a first controlling signal and a second controlling signal so that the light-emitting duration of a light-emitting device is less than the minimum conduction time of the first transistor or the conduction time of the second transistor. In sum, the present disclosure can well deal with the problem that a low grayscale is hard to be shown by the driving circuit of the related art.

BRIEF DESCRIPTION OF THE DRAWINGS

To describe the technical solutions in the embodiments of this application more clearly, the following briefly introduces the accompanying drawings required for describing the embodiments. Apparently, the accompanying drawings in the following description show merely some embodiments of this application, and a person of ordinary skill in the art may still derive other drawings from these accompanying drawings without creative efforts.

DETAILED DESCRIPTION OF THE EMBODIMENTS

To help a person skilled in the art better understand the solutions of the present disclosure, the following clearly and completely describes the technical solutions in the embodiments of the present invention with reference to the accompanying drawings in the embodiments of the present invention. Apparently, the described embodiments are a part rather than all of the embodiments of the present invention. All other embodiments obtained by a person of ordinary skill in the art based on the embodiments of the present invention without creative efforts shall fall within the protection scope of the present disclosure.

The terminology used herein is for the purpose of describing particular embodiments only and is not intended to be limiting of the invention. As used herein, the singular forms "a", "said" and "the" are intended to include the plural forms as well, unless the context clearly indicates otherwise. It will be understood that the term "and/or," when used in this specification, specify one or more associated elements, alone or in combination, are provided. It will be further understood that the terms "first," "second," "third," and "fourth," when used in this specification, claim and drawings, are used to distinguish different objects, rather than to describe a specific order. It will be further understood that the terms "comprises" and/or "comprising," when used in this specification, specify the presence of stated features, products, steps, operations, elements, and/or components, but do not preclude the presence or addition of one or more other features, products, steps, operations, elements, components, and/or groups thereof.

A transistor adopted in the preferred embodiments of the present disclosure may be a thin film transistor (TFT) or a field-effect transistor (FET). A source of the transistor and a drain of the transistor used in the embodiment are symmetrical so the source of the transistor and the drain of the transistor are interchangeable. The transistor includes a gate, a first electrode, and a second electrode in the preferred embodiments of the present disclosure. When the first electrode is a source, the second electrode is a drain. When the first electrode is a drain, the second electrode is a source. In addition, the transistor utilized by the present embodiment is an N-type transistor or a P-type transistor. When the gate of the N-type transistor is conducted at a high voltage level, and the gate of the N-type transistor is cut off at a low voltage level. While the gate of the P-type transistor is conducted at a low voltage level, and the gate of the P-type transistor is cut off at a high voltage level. A light-emitting device D may be either a mini-light-emitting diode (mini-LED) or a micro-light-emitting diode (micro-LED) in the preferred embodiments of the present disclosure.

Figure 1:
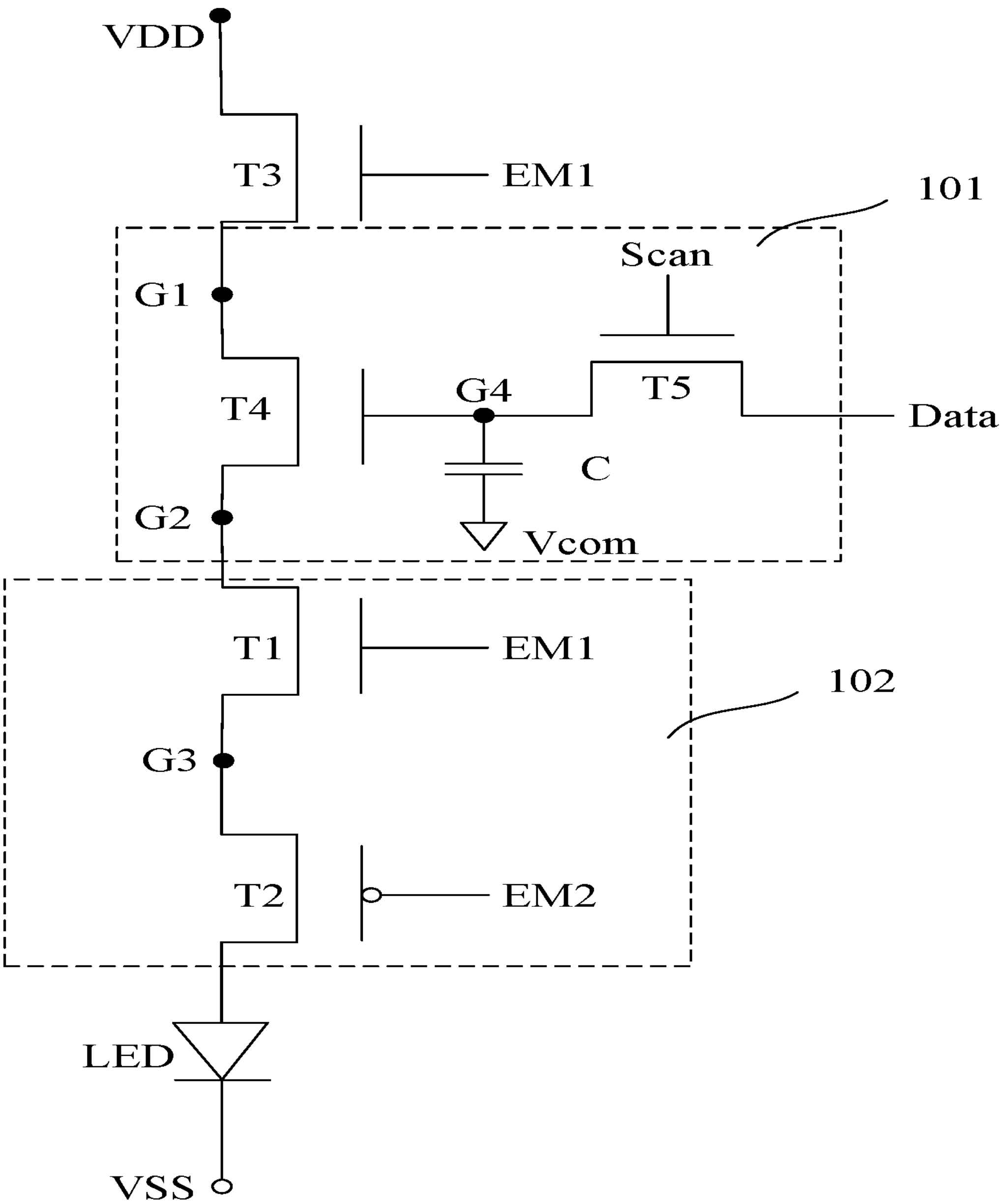
FIG. 1 illustrates a circuit diagram of a driving circuit according to a first embodiment of the present disclosure.

FIG. 1 is a circuit diagram of a driving circuit according to a first embodiment of the present disclosure. The driving circuit 10 includes a light-emitting device D, a light-emitting controlling module 101, and a grayscale controlling module 102. The light-emitting device D is connected to a light-emitting circuit. The light-emitting controlling module 101 is fed with a scanning signal SCAN and a data signal DATA and is connected to the light-emitting circuit. The light-emitting controlling module 101 is configured to convey the data signal DATA to the light-emitting device D under the control of the scanning signal SCAN. The grayscale controlling module 102 is connected to the light-emitting circuit. The grayscale controlling module 102 is configured to control conduction or cutoff of the light-emitting circuit. The grayscale controlling module 102 includes a first transistor T1 and a second transistor T2. A source and a drain of the first transistor T1 and a source and a drain of the second transistor T2 are all connected to the light-emitting circuit. The first transistor T1 and the second transistor T2 overlap to make the light-emitting time of the light-emitting device D be less than the minimum conduction time of the first transistor T1 or the second transistor T2. It is notified that light-emitting device D may be a mini-light-emitting diode (mini-LED), a miniature light-emitting diode, or an organic light-emitting diode (OLED). The light-emitting device D is connected to a light-emitting circuit composed of a first supply voltage terminal VDD and a second power supply terminal VSS. It is understandable that the conduction time overlaps of the first transistor T1 and the second transistor T2 to achieve a lower grayscale display so the display can be displayed in the minimum conduction time of a single transistor. The overlapping extent of the conduction time of the first transistor T1 and the conduction time of the second transistor T2 can be adjusted according to the requirements to realize different periods of conduction time of the light-emitting circuit.

The first transistor T1 is one of an N-type transistor and a P-type transistor, and the second transistor T2 is the other of an N-type transistor and a P-type transistor.

The conduction time of the P-type transistor is greater than the cutoff time in a predetermined period. The driving circuit controls the light-emitting duration of the light-emitting device D based on the conduction time of the N-type transistor. Due to the conductive condition of the P-type transistor, a signal at a low voltage level is input to the gate of the P-type transistor. Due to the conductive condition of the N-type transistor, a signal at a high voltage level is input to the gate of the N-type transistor. Such an arrangement can reduce the power consumption required by the controlling terminal.

A gate of the first transistor T1 is fed with the first controlling signal EM1. A gate of the second transistor T2 is fed with the second controlling signal EM2. There is a phase difference between the first controlling signal EM1 and the second controlling signal EM2.

The driving circuit further includes a third transistor T3. A gate of the third transistor T3 is electrically connected to the first controlling signal EM1. A source of the third transistor T3 and a drain of the third transistor T3 are both disposed between the first supply voltage terminal VDD and other modules. The first electrode of the third transistor T3 is electrically connected to the first supply voltage terminal VDD. The second electrode of the third transistor T3 is electrically connected to a first node G1.

The light-emitting controlling module 101 includes a fourth transistor T4, a fifth transistor T5, and a storage capacitor C. A source of the fourth transistor T4 and a drain of the fourth transistor T4 are both connected to the light-emitting circuit. A gate of the fifth transistor T5 is electrically connected to a scanning terminal SCAN. A first terminal of the fifth transistor T5 is electrically connected to a data terminal DATA. A second terminal of the fifth transistor T5 is electrically connected to a fourth node G4. A gate of the fourth transistor T4 is electrically connected to a fourth node G4. A first terminal of the fourth transistor T4 is electrically connected to the first node G1. The second terminal of the fourth transistor T4 is electrically connected to the second node G2. A gate of the fifth transistor T5 is electrically connected to the scanning terminal SCAN. A first terminal of the fifth transistor T5 is electrically connected to the data terminal DATA. A second terminal of the fifth transistor T5 is electrically connected to the fourth node G4. A terminal of the storage capacitor C is electrically connected to a fourth node G4. Another terminal of the storage capacitor C is electrically connected to a first supply voltage terminal Vcom. A cathode of the light-emitting device D is electrically connected to a second power supply terminal VSS. The light-emitting controlling module 101 may further be disposed between the second transistor T2 and the second power supply terminal VSS (not shown).

The gate of the first transistor T1 is electrically connected to the first controlling terminal EM1. The source of the first transistor T1 and the drain of the first transistor T1 are both connected to the light-emitting circuit. The gate of the second transistor T2 is electrically connected to the second controlling terminal EM2. A source of the second transistor T2 and a drain of the second transistor T2 are both connected to the light-emitting circuit. The gate of the first transistor T1 is electrically connected to the first controlling terminal EM1. The first terminal of the first transistor T1 is electrically connected to the third terminal G3. The second terminal of the first transistor T1 is electrically connected to the second terminal G2. The gate of the second transistor T2 is electrically connected to the second controlling terminal EM2. The first terminal of the second transistor T2 is electrically connected to the third terminal G3. The second terminal of the second transistor T2 is electrically connected to an anode of the light-emitting device D.

The conduction time of the third transistor T3 is equal to the conduction time of the first transistor T1 or conduction time of the second transistor T2. The first transistor T1 and the second transistor T2 are both N-type transistors, and the third transistor T3 is a P-type transistor. Otherwise, the first transistor T1 and the second transistor T2 are both P-type transistors, and the third transistor T3 is an N-type transistor. The third transistor T3 is conducted when or before the first transistor T1 and the second transistor T2 are simultaneously conducted. The third transistor T3 is cut off when or after the first transistor T1 or the second transistor T2 is cut off.

The first transistor T1, the second transistor T2, the third transistor T3, and the fourth transistor T4 may be a low temperature polysilicon TFT, an oxide semiconductor TFT, an amorphous silicon TFT, a field effect transistor, or a combination of the low temperature polysilicon TFT, the oxide semiconductor TFT, the amorphous silicon TFT, and the field effect transistor. Further, the first transistor T1 and the second transistor T2 in the driving circuit 10 are of different types, and the third transistor T3 and the first transistor T1 are of the same type. The first transistor T1 and the third transistor T3 are N-type transistors, and the second transistor T2 is a P-type transistor.

The first supply voltage terminal VDD and the second power supply terminal VSS are both configured to output a predetermined voltage value. Furthermore, the voltage level of the first supply voltage terminal VDD is greater than the voltage level of the second power supply terminal VSS in the embodiment of the present disclosure. Specifically, the voltage level of the second power supply terminal VSS may be the voltage level of a ground terminal.

That the conduction time of the first transistor T1 partially overlaps the conduction time of the second transistor T2 is controlled by the phase difference between the first controlling signal EM1 and the second controlling signal EM2 so that the light-emitting duration of the light-emitting device D is less than the conduction time of the first transistor T1 or the conduction time of the second transistor T2. Therefore, the driving circuit 10 proposed by the present disclosure can successfully deal with the problem that a low grayscale is hard to be shown by the driving circuit of the related art.

Figure 2:
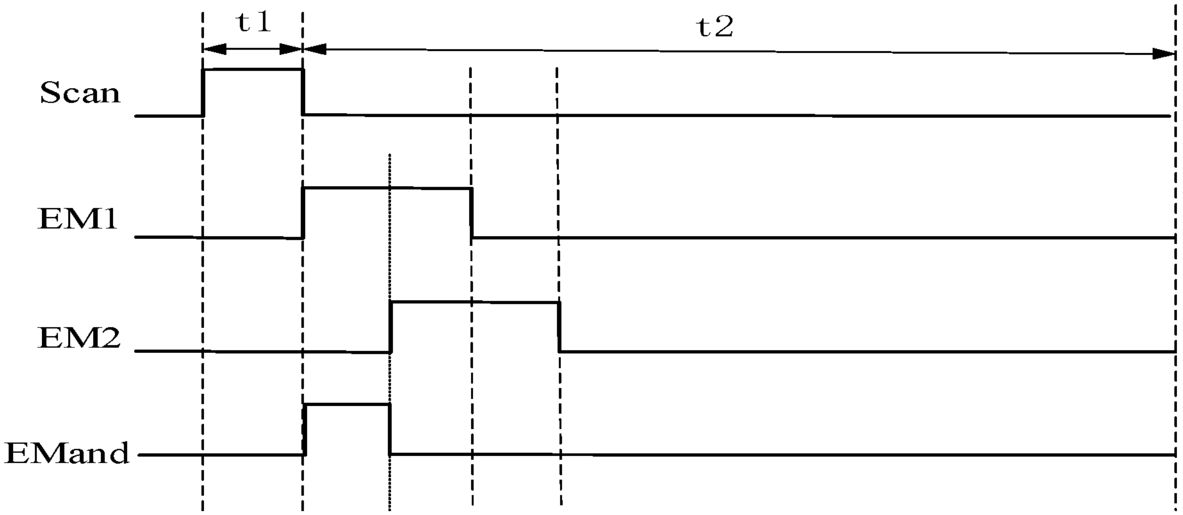
FIG. 2 illustrates a timing diagram of the driving circuit as illustrated in FIG. 1.

FIG. 2 is a timing diagram of the driving circuit 10 proposed by the first embodiment of the present disclosure. The first controlling signal EM1, the second controlling signal EM2, the data signal DATA, and the scanning signal SCAN are combined with one another and then correspond to the data-written phase t1 and the light-emitting phase t2. In other words, the driving controlling timing of the driving circuit 10 includes the data-written phase t1 and the light-emitting phase t2 in one frame of time. The first transistor T1 is an N-type transistor, and the second transistor T2 is a P-type transistor. The first transistor T1 is conducted before the second transistor T2 is conducted, and the first transistor T1 is cut off before the second transistor T2 is cut off.

The duty ratio of the first controlling signal EM1 is equal to the duty ratio of the second controlling signal EM2. The time for simultaneous conduction of the first transistor T1 and the second transistor T2 is less than 6.7 microseconds (μs).

It is notified that the light-emitting device D illuminates in the light-emitting phase t2.

In the data-written phase t1, the scanning signal SCAN is at a high voltage level, the first controlling signal EM1 is at a low voltage level, and the second controlling signal EM2 is at a low voltage level.

In the light-emitting phase t2, the scanning signal SCAN is at a low voltage level, the first controlling signal EM1 is at a high voltage level, and the second controlling signal EM2 is at a high voltage level. The conduction of the first controlling signal EM1 is earlier than the conduction of the second controlling signal EM2. The time for conducting the first controlling signal EM1 is equal to the time for conducting the second controlling signal EM2. In other words, the conduction signal input to the second controlling signal EM2 is later than the conduction signal input to the first controlling signal EM1. The current does not flow through the light-emitting device D until the conduction signal is input to both of the second controlling signal EM2 and the first controlling signal EM1. Therefore, the light-emitting time of the light-emitting device D is the time for conducting the second controlling signal EM2 and the first controlling signal EM1 simultaneously. In this way, the light-emitting time may be regulated by controlling the time of the conduction signal input to the second controlling signal EM2.

When a conductive signal with a certain duration is input to the second controlling signal EM2, an input delay the conductive signal for the second controlling signal EM2 is shorter and the light-emitting time is longer, and an input delay the conductive signal for the second controlling signal EM2 is longer and the light-emitting time is shorter. When a conductive signal input to the second controlling signal EM2 is slower than a conductive signal input to the first controlling signal EM1, the light-emitting time is shorter. The actual light-emitting time is shown like the EM and, which is suitable for low grayscale display.

In the driving circuit of the present embodiment, to input the conduction signal to the second controlling signal EM2 is delayed than to input the first controlling signal EM1, which makes it possible to further shorten the minimum duration for light emission under the premise that the current is constant, thereby ensuring the display of the low grayscale and improving the performance of the driving circuit.

The first supply voltage terminal VDD and the second power supply terminal VSS are direct current (DC) voltage sources.

Figure 3:
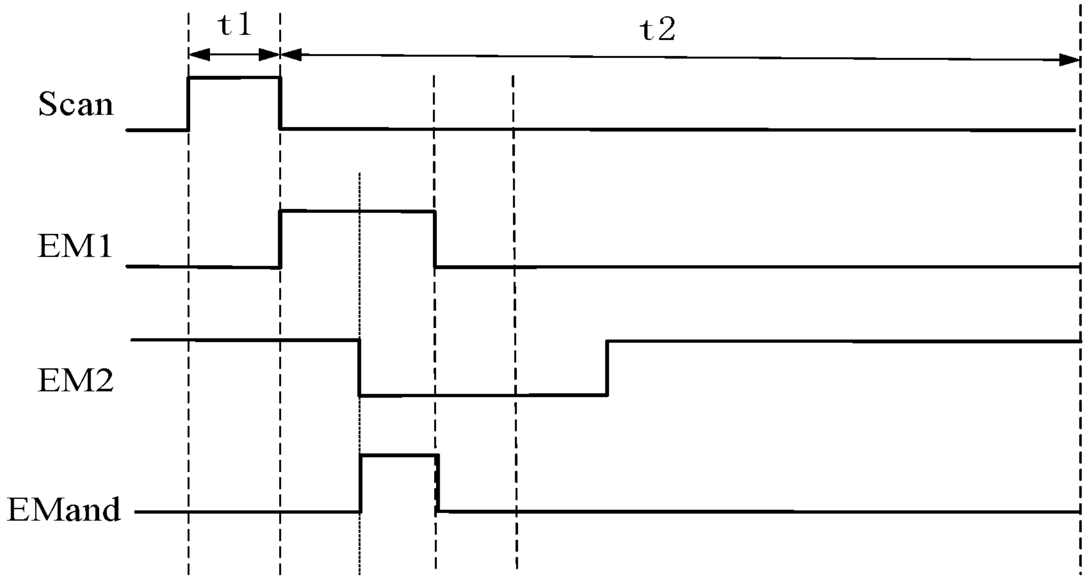
FIG. 3 illustrates another timing diagram of the driving circuit as illustrated in FIG. 1.

Refer to FIG. 3 and FIG. 1. FIG. 3 is another timing diagram of the driving circuit of the first embodiment of the present disclosure. The first transistor T1 and the second transistor T2 are N-type transistors, and T2 is a P-type transistor. There is a phase difference between the first controlling signal EM1 and the second controlling signal EM2. The duty ratio of the first controlling signal EM1 is not equal to the duty ratio of the second controlling signal EM2. As shown in FIG. 3, the duty ratio of the first controlling signal EM1 is less than the duty ratio of the second controlling signal EM2.

Figure 4:
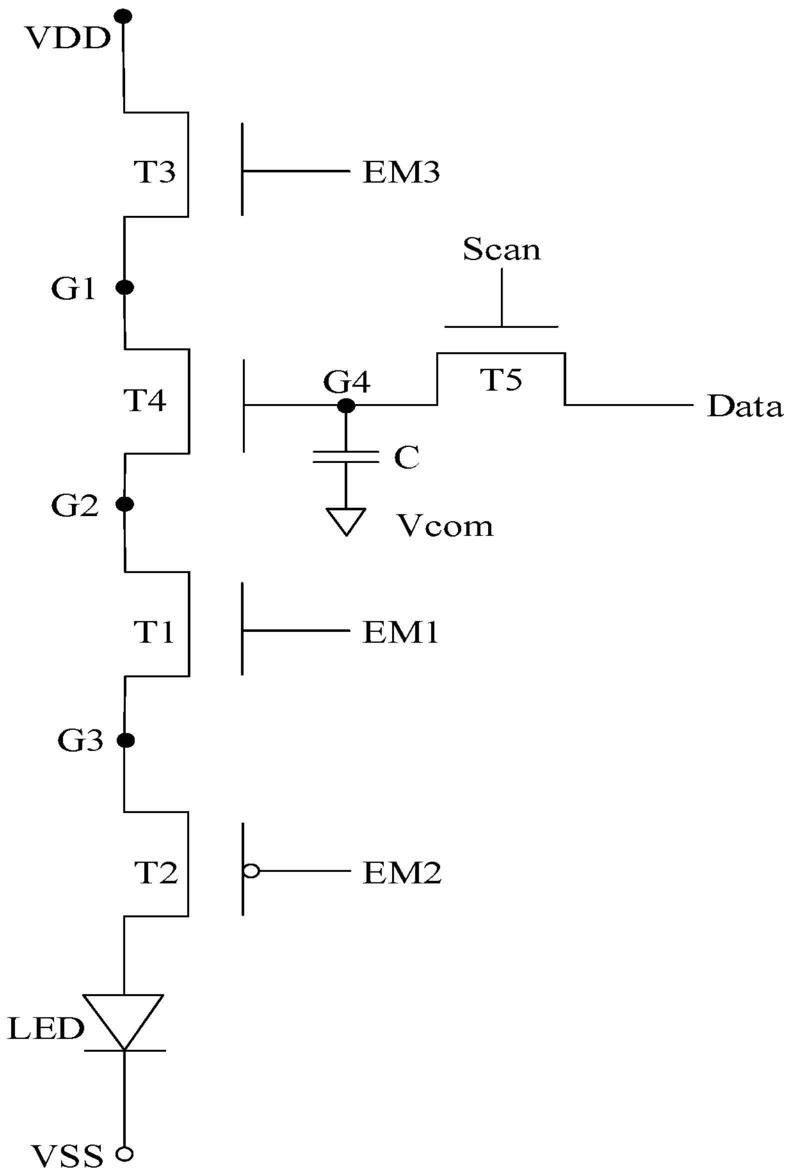
FIG. 4 illustrates a circuit diagram of a driving circuit according to a second embodiment of the present disclosure.
Figure 5:
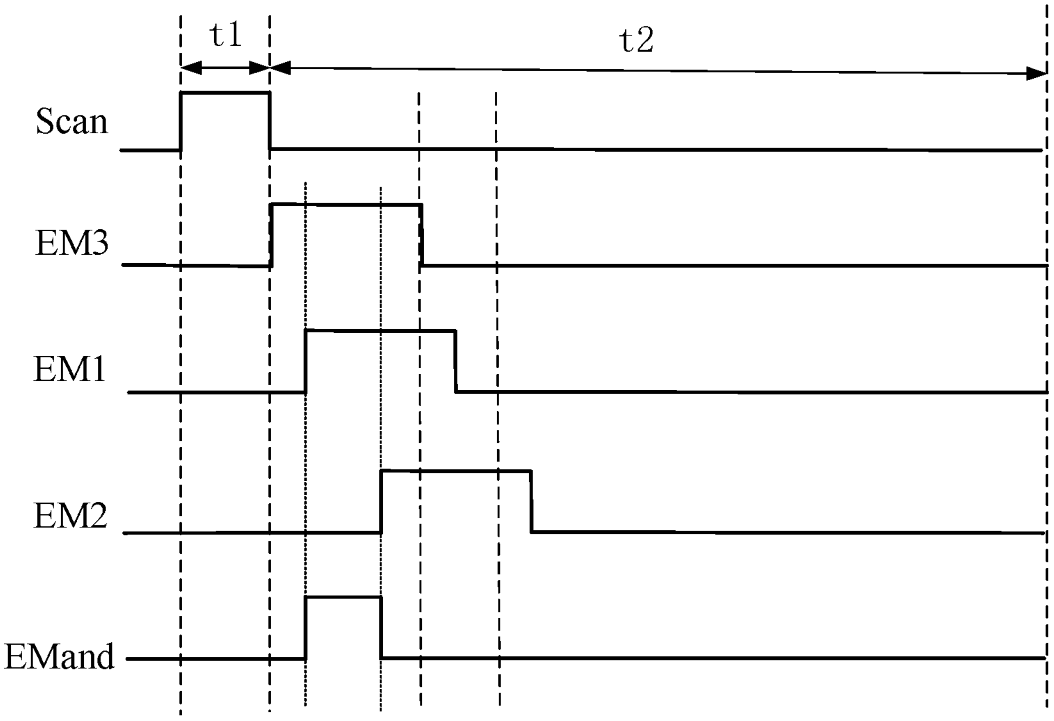
FIG. 5 illustrates a timing diagram of the driving circuit as illustrated in FIG. 4.

Please refer to FIG. 4 and FIG. 5. FIG. 4 is a circuit diagram of a driving circuit according to a second embodiment of the present disclosure. FIG. 5 is a timing diagram of the driving circuit according to the second embodiment of the present disclosure. The difference between FIG. 4 and FIG. 1 is that there is a phase difference between the first controlling signal EM1 and the third controlling signal EM3. The gate of the third transistor T3 is fed with the third controlling signal EM3.

As FIG. 5 illustrates, the third transistor T3 is conducted before the first transistor T1 is conducted, and the first transistor T1 is conducted before the second transistor T2 is conducted. Preferably, the duty ratio of the first controlling signal EM1 is equal to the duty ratio of the second controlling signal EM2 and the duty ratio of the third controlling signal EM3. Specifically, the time for conducting the first transistor T1, the time for conducting the second transistor T2, and the time for conducting the third transistor T3 may not be equal to one another.

In the data-written phase t1, the scanning signal SCAN is at a high voltage level, the first controlling signal EM1 is at a low voltage level, the second controlling signal EM2 is at a low voltage level, and the third controlling signal EM3 is at a low voltage level.

In the light-emitting phase t2, the scanning signal SCAN is at a low voltage level, the first controlling signal EM1 is at a high voltage level, the second controlling signal EM2 is at a high voltage level, and the third controlling signal EM3 is at a high voltage level. The third transistor T3 is conducted before the first transistor T1 is conducted, and the first transistor T1 is conducted before the second transistor T2 is conducted. The light-emitting time of the light-emitting device D is the time for conducting the third controlling signal EM3, the second controlling signal EM2, and the first controlling signal EM1 simultaneously. Because a conductive signal input to the first controlling signal EM1 is slower than a conductive signal input to the third controlling signal EM3 and a conductive signal input to the second controlling signal EM2 is slower than a conductive signal input to the first controlling signal EM1, the light-emitting time is shorter and suitable for low grayscale display, as the EM and shows actually.

In the driving circuit of the present embodiment, to input the conduction signal to the second controlling signal EM2 is delayed than to input the first controlling signal EM1, which makes it possible to further shorten the minimum duration for light emission, thereby ensuring the display of the low grayscale and improving the performance of the driving circuit.

Figure 6:
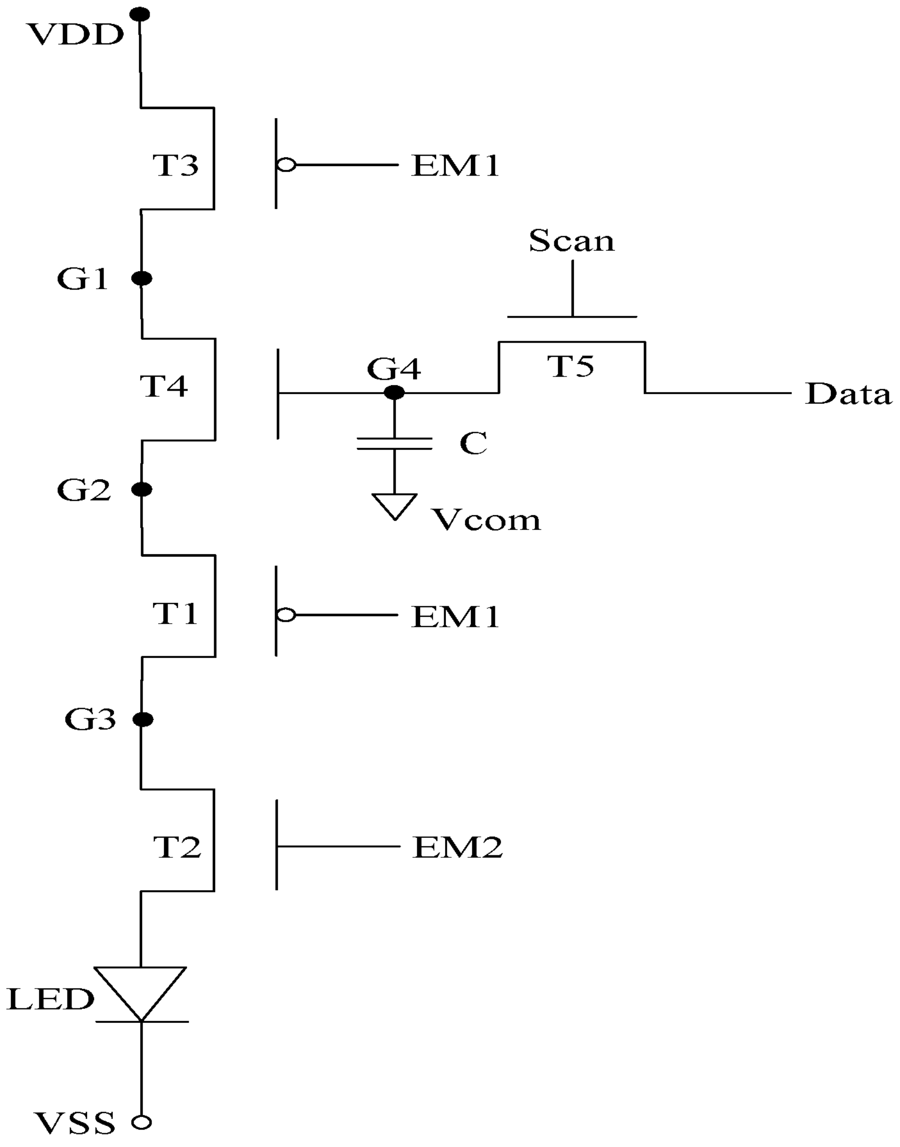
FIG. 6 illustrates a circuit diagram of a driving circuit according to a third embodiment of the present disclosure.
Figure 7:
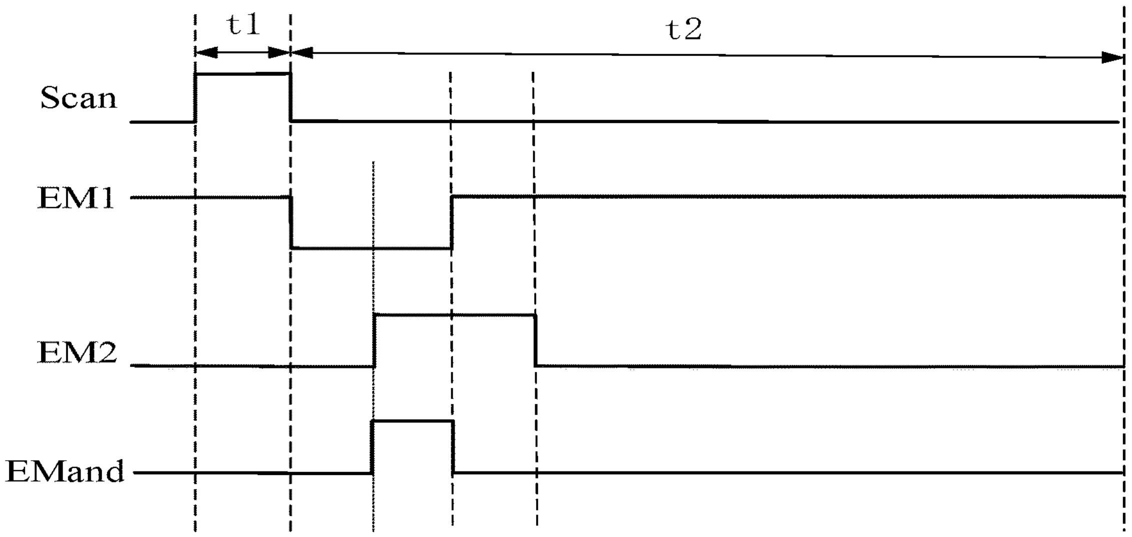
FIG. 7 illustrates a timing diagram of the driving circuit as illustrated in FIG. 6.

Please refer to FIG. 6 and FIG. 7. FIG. 6 is a circuit diagram of a driving circuit according to a third embodiment of the present disclosure. FIG. 7 is a timing diagram of the driving circuit according to the third embodiment of the present disclosure. The difference between FIG. 6 and FIG. 1 is that a first transistor T1 and a third transistor T3 are both P-type transistors, and a second transistor T2 is an N-type transistor. A gate of the first transistor T1 and a gate of the third transistor T3 are both fed with a first controlling signal EM1.

As FIG. 7 illustrates, the first transistor T1 is conducted before the third transistor T3 is conducted. Preferably, the duty ratio of the first controlling signal EM1 is equal to the duty ratio of a second controlling signal EM2. The time for conducting the first transistor T1 may not be equal to the time for conducting the second transistor T2.

In the data-written phase t1, the scanning signal SCAN is at a high voltage level, the first controlling signal EM1 is at a high voltage level, and the second controlling signal EM2 is at a low voltage level.

In the light-emitting phase t2, the scanning signal SCAN is at a low voltage level, the first controlling signal EM1 is at a low voltage level, and the second controlling signal EM2 is at a high voltage level. The first controlling signal EM1 is conducted before the second controlling signal EM2 is conducted, and the time for conducting the first controlling signal EM1 is the same as the time for conducting the second controlling signal EM2. The light-emitting time of the light-emitting device D is the time for conducting the first controlling signal EM1 and the second controlling signal EM2 simultaneously. Because the conductive signal input to the second controlling signal EM2 is slower than the conductive signal input to the first controlling signal EM1, the light-emitting time is shorter and suitable for low grayscale display, as the EM and shows actually.

In the driving circuit of the present embodiment, to input the conduction signal to the second controlling signal EM2 is delayed than to input the first controlling signal EM1, which makes it possible to further shorten the minimum duration for light emission under the premise that the current is constant, thereby ensuring the display of the low grayscale and improving the performance of the driving circuit.

Figure 8:
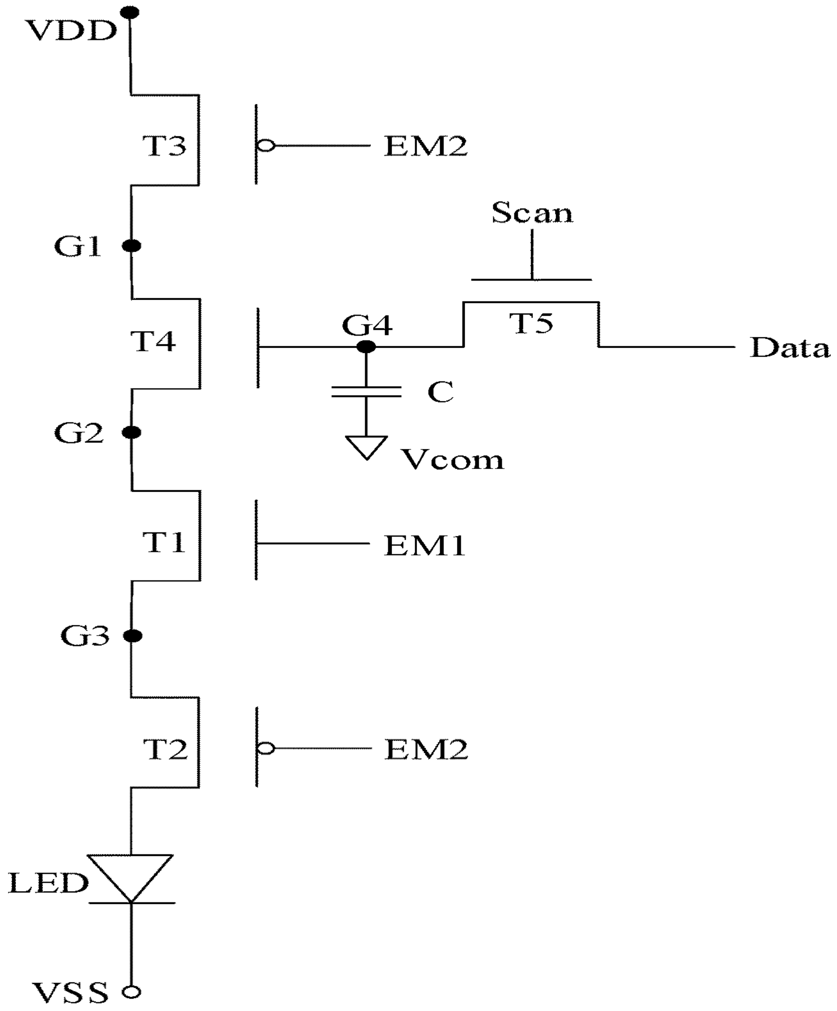
FIG. 8 illustrates a circuit diagram of a driving circuit according to a fourth embodiment of the present disclosure.
Figure 9:
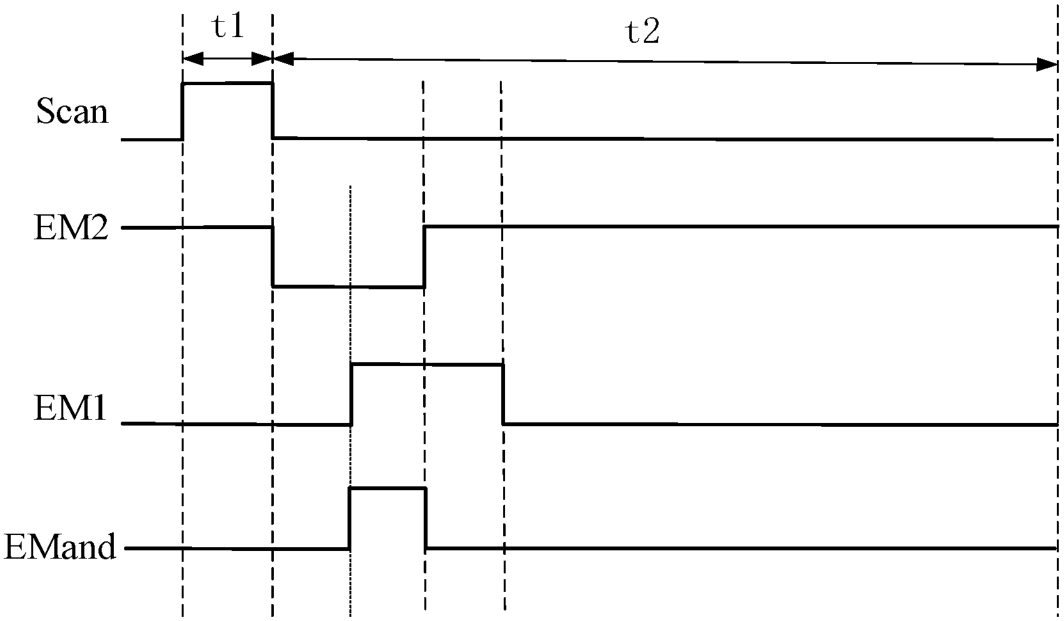
FIG. 9 illustrates a timing diagram of the driving circuit as illustrated in FIG. 8.

Please refer to FIG. 8 and FIG. 9. FIG. 8 is a circuit diagram of a driving circuit according to a fourth embodiment of the present disclosure. FIG. 9 is a timing diagram of the driving circuit according to the fourth embodiment of the present disclosure. The difference between FIG. 8 and FIG. 1 is that a second transistor T2 and a third transistor T3 are both P-type transistors, and a first transistor T1 is an N-type transistor. A gate of the second transistor T2 and a gate of the third transistor T3 are both fed with a second controlling signal EM2.

As FIG. 9 illustrates, the third transistor T3 is conducted before the first transistor T1 is conducted. Preferably, the duty ratio of the second controlling signal EM2 is equal to the duty ratio of the first controlling signal EM1. Specifically, the time for conducting the third transistor T3 may not be equal to the time for conducting the second transistor T2.

In the data-written phase t1, the scanning signal SCAN is at a high voltage level, the first controlling signal EM1 is at a low voltage level, and the second controlling signal EM2 is at a high voltage level.

In the light-emitting phase t2, the scanning signal SCAN is at a low voltage level, the first controlling signal EM1 is at a high voltage level, and the second controlling signal EM2 is at a low voltage level. The second controlling signal EM2 is conducted before the first controlling signal EM1 is conducted, and the time for conducting the first controlling signal EM1 is the same as the time for conducting the second controlling signal EM2. The light-emitting time of the light-emitting device D is the time for conducting the second controlling signal EM2 and the first controlling signal EM1 simultaneously. Because the conductive signal input to the second controlling signal EM2 is slower than the conductive signal input to the first controlling signal EM1, the light-emitting time is shorter and suitable for low grayscale display, as the EM and shows actually.

In the driving circuit of the present embodiment, to input the conduction signal to the second controlling signal EM2 is delayed than to input the first controlling signal EM1, which makes it possible to further shorten the minimum duration for light emission, thereby ensuring the display of the low grayscale and improving the performance of the driving circuit.

Figure 10:
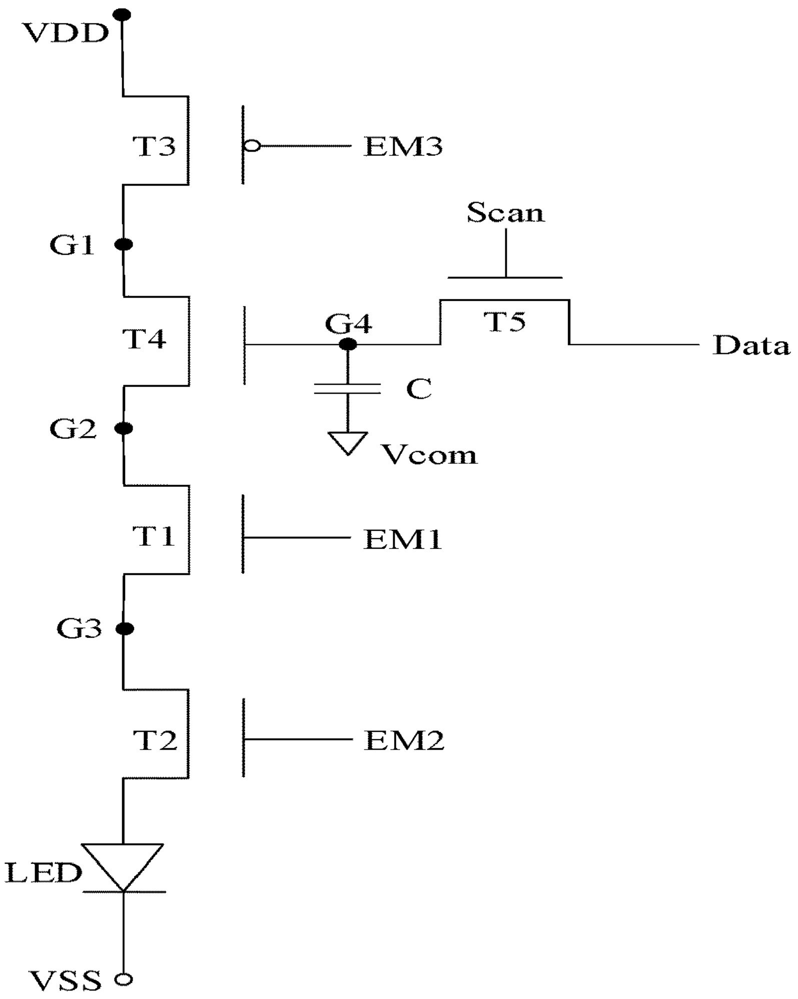
FIG. 10 illustrates a circuit diagram of a driving circuit according to a fifth embodiment of the present disclosure.
Figure 11:
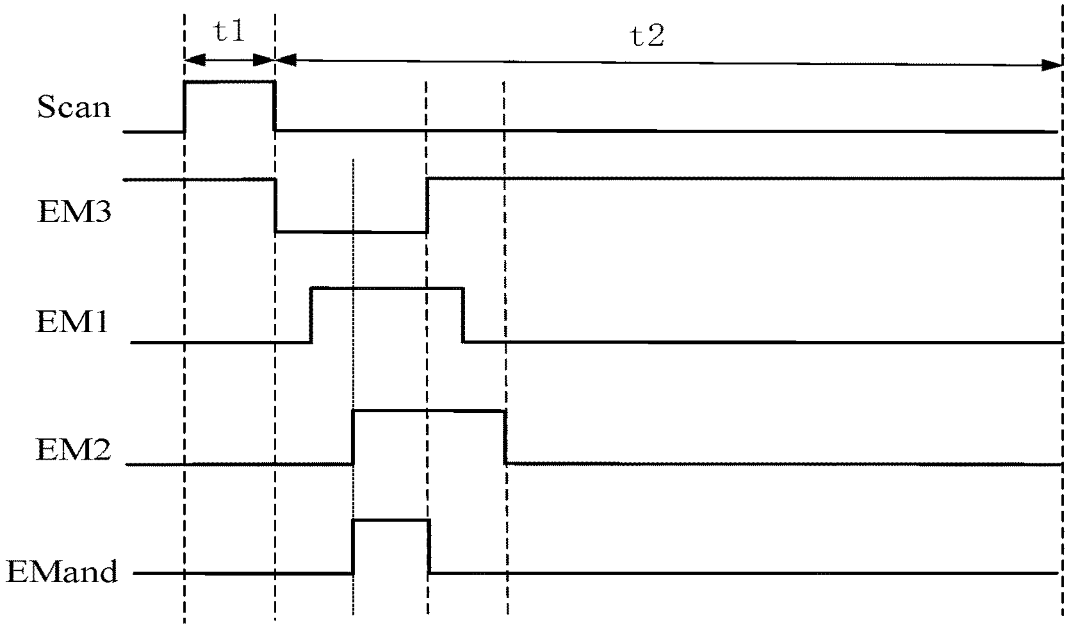
FIG. 11 illustrates a timing diagram of the driving circuit as illustrated in FIG. 10.

Please refer to FIG. 10 and FIG. 11. FIG. 10 is a circuit diagram of a driving circuit according to a fifth embodiment of the present disclosure. FIG. 11 is a timing diagram of the driving circuit according to the fifth embodiment of the present disclosure. The difference between FIG. 10 and FIG. 1 is that a first transistor T1 and a second transistor T2 are both N-type transistors, and a third transistor T3 is a P-type transistor. A gate of the first transistor T1 is fed with a first controlling signal EM1. A gate of the second transistor T2 is fed with a second controlling signal EM2. A gate of the third transistor T3 is fed with a third controlling signal EM3.

As FIG. 11 illustrates, the third transistor T3 is conducted before the first transistor T1 is conducted, and the first transistor T1 is conducted before the second transistor T2 is conducted. Preferably, the duty ratio of the third controlling signal EM3 and the duty ratio of the second controlling signal EM2 are both equal to the duty ratio of the first controlling signal EM1. Specifically, the time for conducting the third transistor T3 may not be equal to the time for conducting the second transistor T2.

In the data-written phase t1, the scanning signal SCAN is at a high voltage level, the first controlling signal EM1 is at a low voltage level, the second controlling signal EM2 is at a low voltage level, and the third controlling signal EM3 is at a high voltage level.

Specifically, in the light-emitting phase t2, the scanning signal SCAN is at a low voltage level, the first controlling signal EM1 is at a high voltage level, the second controlling signal EM2 is at a high voltage level, and the third controlling signal EM3 is at a low voltage level. The third transistor T3 is conducted before the first transistor T1 is conducted, and the first transistor T1 is conducted before the second transistor T2 is conducted. The light-emitting time of the light-emitting device D is the time for conducting the third controlling signal EM3, the second controlling signal EM2, and the first controlling signal EM1 simultaneously. Because a conductive signal input to the first controlling signal EM1 is slower than a conductive signal input to the third controlling signal EM3 and a conductive signal input to the second controlling signal EM2 is slower than a conductive signal input to the first controlling signal EM1, the light-emitting time is shorter and suitable for low grayscale display, as the EM and shows actually.

In the driving circuit of the present embodiment, to input the conduction signal to the second controlling signal EM2 is delayed than to input the first controlling signal EM1, which makes it possible to further shorten the minimum duration for light emission, thereby ensuring the display of the low grayscale and improving the performance of the driving circuit.

Figure 12:
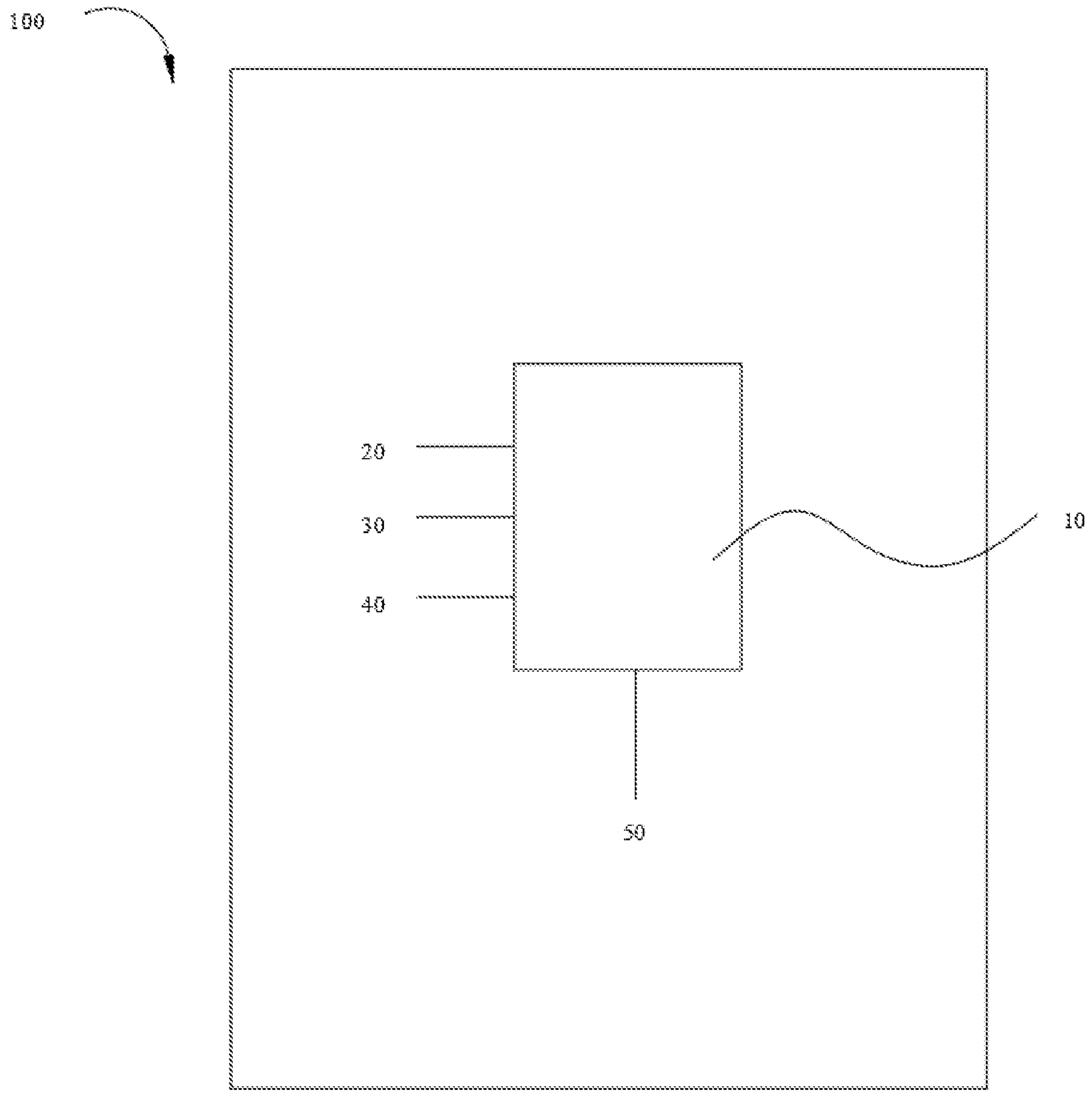
FIG. 12 illustrates a schematic diagram of a backlight module according to another embodiment of the present disclosure.

Please refer to FIG. 12. FIG. 12 is a schematic diagram of a backlight module 100 according to a preferred embodiment of the present disclosure. The present disclosure further proposes the backlight module 100. The backlight module 100 includes a data line 20, a first controlling signal line 30, a second controlling signal line 40, a scanning line 50, and a driving circuit 10, which has been detailed in the preferred embodiments. The data line 20 is configured to provide a data signal. The first controlling signal line 30 is configured to provide a first controlling signal. The second controlling signal line 40 is configured to provide a second controlling signal. The scanning line 50 is configured to provide a scanning signal. The driving circuit 10 is connected to the data line 20, the first controlling signal line 30, the second controlling signal line 40, and the scanning line 50. A light-emitting device D may be either a mini-light-emitting diode (mini-LED) or a micro-light-emitting diode (micro-LED). The driving circuit 10 has been detailed in the preferred embodiments of the present disclosure so the detail of the driving circuit 10 will be skipped.

Figure 13:
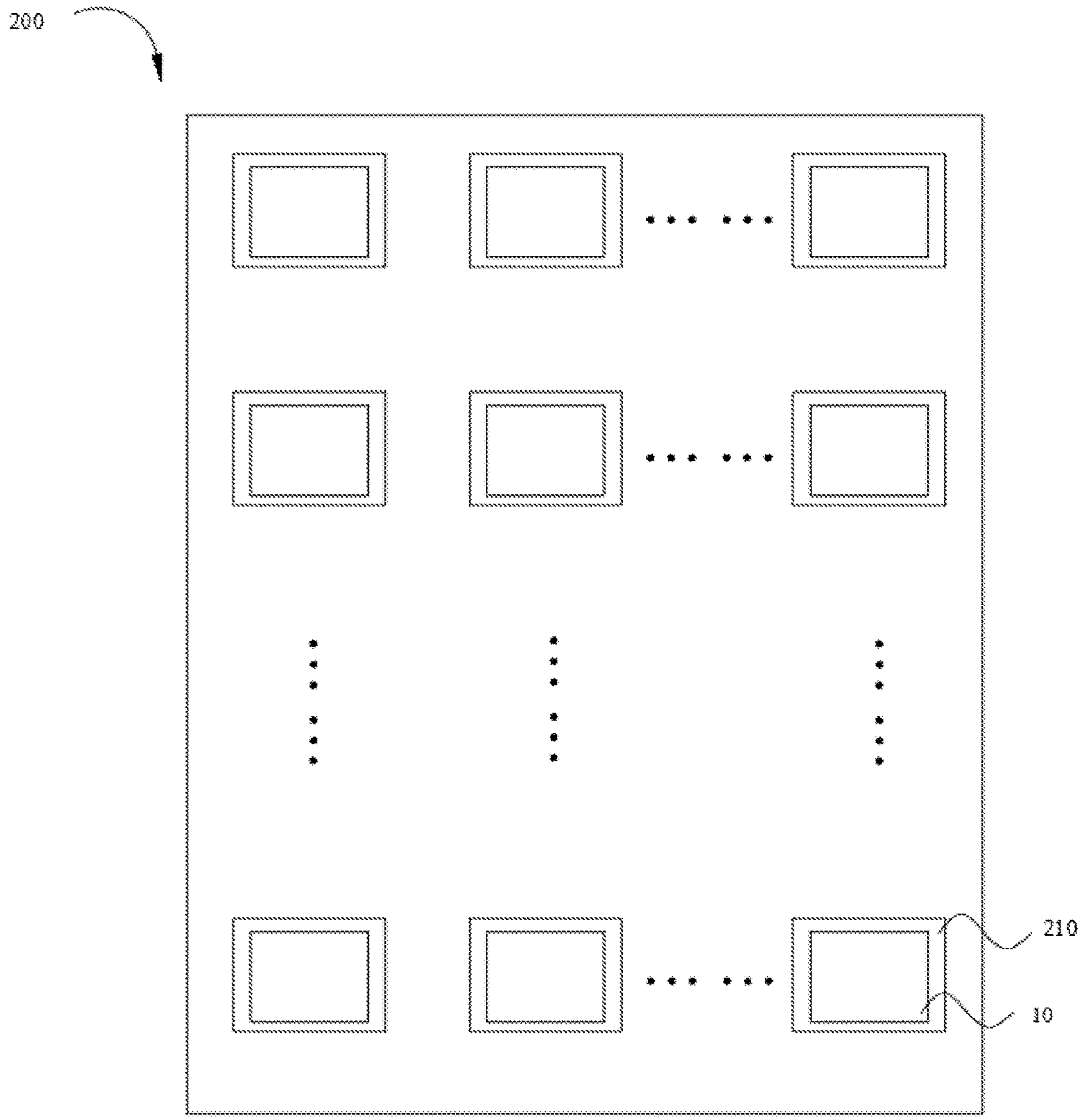
FIG. 13 illustrates a schematic diagram of a display panel according to another embodiment of the present disclosure.

Please refer to FIG. 13. FIG. 13 is a schematic diagram of a display panel 200 according to a preferred embodiment of the present disclosure. The present disclosure further proposes the display panel 200. The display panel 200 includes a plurality of pixel units 210. The plurality of pixel units 210 are arranged in an array. Each of the plurality of pixel units 210 includes a driving circuit 10, which has been detailed in the preferred embodiments. The light-emitting device D may be either a mini-light-emitting diode (mini-LED) or a micro-light-emitting diode (micro-LED). The driving circuit 10 has been detailed as introduced above so the detail description of the driving circuit 10 will be skipped here.

The display panel may be a product or component, such as a piece of electronic paper, a mobile phone, a tablet computer, a television, a monitor, a notebook computer, a digital photo frame, a navigator, etc., of which has a function of display.

The present disclosure has been described with a preferred embodiment thereof. The preferred embodiment is not intended to limit the present disclosure, and it is understood that many changes and modifications to the described embodiment can be carried out without departing from the scope and the spirit of the disclosure that is intended to be limited only by the appended claims.

What is claimed is:

1. A driving circuit, comprising:
- a light-emitting device, connected to a light-emitting circuit;
- a light-emitting controlling module that is fed with a scanning signal and a data signal, and is connected to the light-emitting circuit, configured to deliver the data signal to the light-emitting device in response to the scanning signal; and
- a grayscale controlling module, connected to the light-emitting circuit and configured to control conduction or cutoff of the light-emitting circuit; the grayscale controlling module comprising a first transistor and a second transistor; a source and a drain of the first transistor and a source and a drain of the second transistor all being connected to the light-emitting circuit; wherein a conduction time of the first transistor partially overlaps the conduction time of the second transistor to realize that a light-emitting duration of the light-emitting device is less than a minimum conduction time of the first transistor or the minimum conduction time of the second transistor.

2. The driving circuit according to claim 1, wherein the first transistor is one of an N-type transistor and a P-type transistor, and the second transistor is the other of an N-type transistor and a P-type transistor.

3. The driving circuit according to claim 2, wherein a conduction time of the P-type transistor is greater than a cut-off time of the P-type transistor in a predetermined period; the driving circuit controls a light-emitting duration of the light-emitting device based on the conduction time of the N-type transistor.

4. The driving circuit according to claim 2, wherein a gate of the first transistor is fed with a first controlling signal; a gate of the second transistor is fed with a second controlling signal; there is a phase difference between the first controlling signal and the second controlling signal.

5. The driving circuit according to claim 4, wherein a duty ratio of the first controlling signal is equal to a duty ratio of the second controlling signal.

6. The driving circuit according to claim 4, wherein the first transistor is conducted before the second transistor is conducted, and the first transistor is cut off before the second transistor is cut off; or the second transistor is conducted before the first transistor is conducted, and the second transistor is cut off before the first transistor is cut off.

7. The driving circuit according to claim 1, further comprising a third transistor; a gate of the third transistor is electrically connected to a third controlling terminal; a source of the third transistor and a drain of the third transistor are both connected between a first supply voltage terminal and other modules.

8. The driving circuit according to claim 7, wherein the first transistor and the second transistor are both N-type transistors, and the third transistor is a P-type transistor; or the first transistor and the second transistor are both P-type transistors, and the third transistor is an N-type transistor.

9. The driving circuit according to claim 8, wherein the third transistor is conducted when or before the first transistor and the second transistor are simultaneously conducted; the third transistor is cut off when or after the first transistor or the second transistor is cut off.

10. The driving circuit according to claim 9, wherein the conduction time of the third transistor is equal to the conduction time of the first transistor or the conduction time of the second transistor.

11. The driving circuit according to claim 1, wherein the light-emitting controlling module comprises:

a fourth transistor, having a gate connected to a fourth node, a source and a drain both connected with the light-emitting circuit;

a fifth transistor, having a gate electrically connected to a scanning terminal, a source electrically connected to a data terminal, and a drain electrically connected to the fourth node; and a storage capacitor, electrically connected between the fourth node and a first supply voltage terminal;

the gate of the first transistor being electrically connected to the first controlling terminal; the source of the first transistor and the drain of the first transistor both connected to the light-emitting circuit;

the gate of the second transistor being electrically connected to a second controlling terminal; the source of the second transistor and the drain of the second transistor both connected to the light-emitting circuit.

12. A display panel comprising a plurality of pixel units arranged in an array, each of the plurality of pixel units comprising a driving circuit, the driving circuit comprising:

a light-emitting device, connected to a light-emitting circuit;

a light-emitting controlling module that is fed with a scanning signal and a data signal and is connected to the light-emitting circuit, configured to deliver the data signal to the light-emitting device in response to the scanning signal; and a grayscale controlling module, connected to the light-emitting circuit and configured to control conduction or cutoff of the light-emitting circuit; the grayscale controlling module comprising a first transistor and a second transistor; a source and a drain of the first transistor and a source and a drain of the second transistor all being connected to the light-emitting circuit; wherein a conduction time of the first transistor partially overlaps the conduction time of the second transistor to realize that a light-emitting duration of the light-emitting device is less than a minimum conduction time of the first transistor or the minimum conduction time of the second transistor, wherein the first transistor is one of an N-type transistor and a P-type transistor, and the second transistor is the other of an N-type transistor and a P-type transistor, and wherein a conduction time of the P-type transistor is greater than a cut-off time of the P-type transistor in a predetermined period; the driving circuit controls a light-emitting duration of the light-emitting device based on the conduction time of the N-type transistor.

13. The display panel according to claim 12, wherein a gate of the first transistor is fed with a first controlling signal; a gate of the second transistor is fed with a second controlling signal; there is a phase difference between the first controlling signal and the second controlling signal.

14. The display panel according to claim 13, wherein a duty ratio of the first controlling signal is equal to a duty ratio of the second controlling signal.

15. The display panel according to claim 13, wherein the first transistor is conducted before the second transistor is conducted, and the first transistor is cut off before the second transistor is cut off; or the second transistor is conducted before the first transistor is conducted, and the second transistor is cut off before the first transistor is cut off.

16. The display panel according to claim 12, wherein the driving circuit further comprises a third transistor; a gate of the third transistor is electrically connected to a third controlling terminal; a source of the third transistor and a drain of the third transistor are both connected between a first supply voltage terminal and other modules.

17. The display panel according to claim 16, wherein the first transistor and the second transistor are both N-type transistors, and the third transistor is a P-type transistor; or the first transistor and the second transistor are both P-type transistors, and the third transistor is an N-type transistor.

18. The display panel according to claim 17, wherein the third transistor is conducted when or before the first transistor and the second transistor are simultaneously conducted; the third transistor is cut off when or after the first transistor or the second transistor is cut off.

19. The display panel according to claim 18, wherein the conduction time of the third transistor is equal to the conduction time of the first transistor or the conduction time of the second transistor.

20. The display panel according to claim 12, wherein the light-emitting controlling module comprises:

a fourth transistor, having a gate connected to a fourth node, a source and a drain both connected with the light-emitting circuit;

a fifth transistor, having a gate electrically connected to a scanning terminal, a source electrically connected to a data terminal, and a drain electrically connected to the fourth node; and a storage capacitor, electrically connected between the fourth node and a first supply voltage terminal;

the gate of the first transistor being electrically connected to the first controlling terminal; the source of the first transistor and the drain of the first transistor both connected to the light-emitting circuit;

the gate of the second transistor being electrically connected to a second controlling terminal; the source of the second transistor and the drain of the second transistor both connected to the light-emitting circuit.

* * * * *